March 30, 1965     C. BURNS     3,176,306
APPARATUS FOR TESTING SURFACE QUALITY OF MATERIAL
Filed May 7, 1962     7 Sheets-Sheet 1

INVENTOR
Charles Burns
BY
ATTORNEY

March 30, 1965 C. BURNS 3,176,306
APPARATUS FOR TESTING SURFACE QUALITY OF MATERIAL
Filed May 7, 1962 7 Sheets-Sheet 2

INVENTOR
Charles Burns
BY
ATTORNEY

FIG. 7.

INVENTOR
Charles Burns

March 30, 1965 C. BURNS 3,176,306
APPARATUS FOR TESTING SURFACE QUALITY OF MATERIAL
Filed May 7, 1962 7 Sheets-Sheet 4

INVENTOR
Charles Burns
BY
ATTORNEY

March 30, 1965 C. BURNS 3,176,306
APPARATUS FOR TESTING SURFACE QUALITY OF MATERIAL
Filed May 7, 1962 7 Sheets-Sheet 6

FIG. 12.

INVENTOR
Charles Burns
BY
ATTORNEY

FIG. 13.

United States Patent Office 3,176,306
Patented Mar. 30, 1965

3,176,306
APPARATUS FOR TESTING SURFACE QUALITY OF MATERIAL
Charles Burns, Worcester Park, Surrey, England, assignor to The British Iron & Steel Research Association
Filed May 7, 1962, Ser. No. 192,942
Claims priority, application Great Britain, Sept. 5, 1961, 31,846/61
15 Claims. (Cl. 346—33)

This invention is concerned with improvements in and relating to apparatus for testing surface quality of material and more particularly for testing the quality of moving sheet material such as tinplate as it issues from a mill.

Inspection of electrolytic tinplate for surface defects has hitherto, so far as is known, been by eye on a continuous line after the tinplate has been cut into sheets. Defects embrace a wide variety from "unflowmelted" where the tinning may be defective across the entire width of the strip, to scratches and quite small spots, say of the order of 0.1 inch diameter. In addition to impairment of the surface finish on flat plate, a number of defects, e.g. wavy edges, surface laminations which affect the contour of the surface are classified as defects although the actual surface finish may be unimpaired.

Direct visual inspection of the moving sheet to a satisfactory standard is possible at line speeds of a few hundred ft. per min. At higher line speeds, of the order of 1200 to 1500 ft. per min. satisfactory direct visual inspection is not possible, at such speeds only the grossest defects being able to be detected by the unaided eye.

It is an object of the present invention to provide apparatus for enabling defects in the surface quality of sheet moving at such high line speeds to be detected. As will be appreciated from the following description, the apparatus is also suitable for use with sheet travelling at lower line speeds.

According to the invention there is provided apparatus for testing the quality of moving sheet material comprising a light source, means for receiving light from the light source specularly or diffusely reflected from the material under test, and means for presenting light reflections received by the light receiving means in a form indicating the quality of the material.

In order that the present invention may be well understood there will now be described some embodiments thereof, given by way of example only, reference being had to the accompanying drawings, in which.

Tin sheet may be optically inspected because of its high specular reflectivity. Reflected light from prime quality material is concentrated closely in the direction which it would follow if the sheet were a perfect mirror. The angular width of this concentration varies somewhat in the range of material classed as prime. Localised faults in the sheet have a much higher diffuse reflectivity than prime material and if the eye or viewing lens is located in the path of specular reflection, these faults will show as dark patches. Conversely, if the eye or viewing lens is located off the path of specular reflection, faults will appear as bright patches against a dark background. These may be seen from FIGURE 1.

Figure 2:
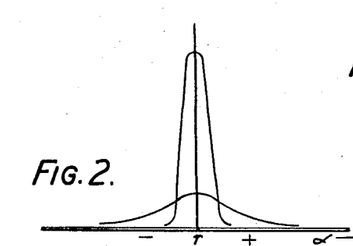
FIGURE 2 is a diagrammatic illustration of the direction of the reflected light.

The diffuse reflectivity itself has a distribution pattern which, though wider than the specular concentration also rises to a maximum in the direction of the specular reflection. The pattern of specular and diffuse reflection may be seen from FIGURE 2, from which it will be appreciated that diffusely reflecting faults in the surface are best observed in a direction fairly close to the direction of specular reflection.

Not only will the surface faults produce diffuse reflection to provide a contrast, but so also will faults causing indentation or convexity where the surface is specularly reflecting, because these indentations or convexities will throw their specular reflection outside the normal specular reflection path.

These characteristics are used in conjunction with a television camera and other means to be described in order to obtain an image of a sheet or an area as it passes so that an overall view of the sheet or area of sheet may be obtained at one time to assess its quality.

Figure 3:
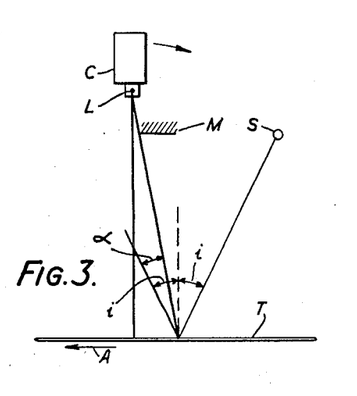
FIGURES 3 and 4 are respectively diagrammatic views of an arrangement for viewing a sheet, and an instantaneous view obtained.

Referring now to FIGURE 3, T indicates a length of tinsheet travelling in the direction indicated by the arrow A. Above the path of the tinsheet is located a light source S extending transversely above the path of the tinsheet, a television camera C pivoted about an axis passing through the camera lens L and perpendicular to the plane of the drawing, and a mask M. The angle SPL is greater than half the angle of specular reflection and the field of view of the camera is sufficiently large to accommodate either the whole of the sheet to be inspected (usually 6 ft. x 3 ft. at most) or such a lesser area as it is desired to examine. The screen M is provided to cut off specular reflection from the tinsheet upstream of the point P, and is spaced well from the surface of the sheet in order not to interrupt the diffuse reflection from the point P.

Figure 4:
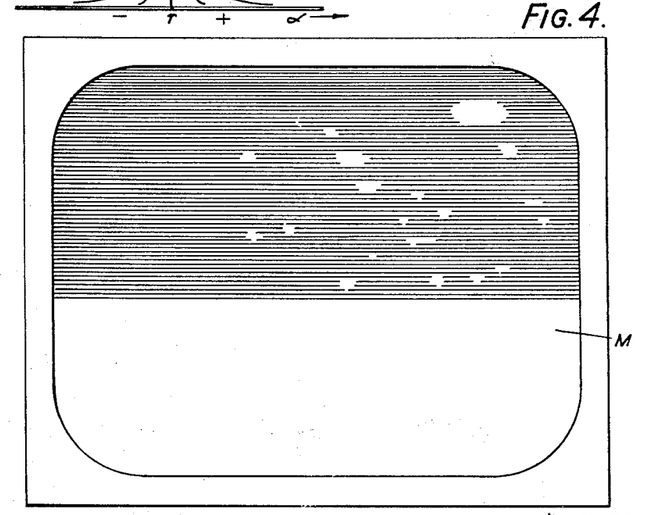

In operation the camera will be rotated clockwise as viewed in the drawing in order to neutralise optically the apparent movement of the sheet relative to the camera, and a succession of images of consecutive portions of the sheet will be recorded by the camera, although not visible at the same time. In FIGURE 4 is shown an image of one portion of the sheet which would be obtained were the mask to be omitted. The lower half of the image appears bright due to specular reflection from upstream of the point P, and the addition of the mask would remove this bright area of the image. It will furthermore be appreciated that the consecutive images will appear at different portions of the light sensitive area of the camera. In order to obtain images of the consecutive portions of the sheet, all of which images may be viewed at the same time, a long persistence or image storage tube is used whereby the whole picture of the consecutive portions and hence of the sheet is built up. Since all of the images are confined to the area adjacent to P (this being the only part diffusely illuminated), there will be a degree of distortion in the complete picture which is formed on a cylindrical projection instead of a plane. The width of the sheet at either end will be exaggerated by a factor equal to $$\frac{1}{\cos \alpha}$$

where $\alpha$ is the angle of view subtended by the complete image. This will resemble "pin cushion distortion" but is not truly this, as lines at right angles to the direction in which the sheet is travelling will still appear straight. It will be a small effect, usually under 5%.

It will be noted that if more than one camera and monitor is used, it is possible from the same lighting arrangement, to obtain pictures of the sheet simultaneously at different conditions of lighting. Each camera would be rotated at the same speed and have its own screen M to determine the limiting angle at which diffuse light was collected. The cameras would be then aligned parallel to each other.

Alternatively, two cameras could be set at an angle to produce images of the front and back half, says, of an elongated sheet, at a greater magnification. This method could also be used for continuous monitoring of uncut sheet for production in coil. The "flybacks" of the cameras would then be alternated, and equal in duration to the "panning" motion.

Figure 5:
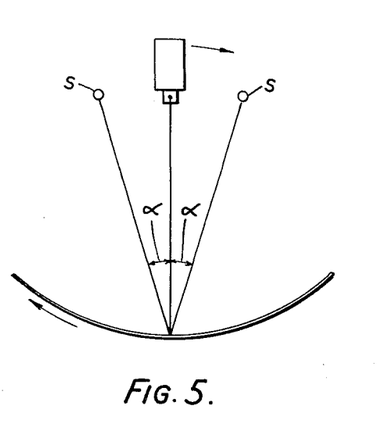
FIGURES 5 and 6 are respectively another viewing arrangement and the view obtained.
Figure 6:
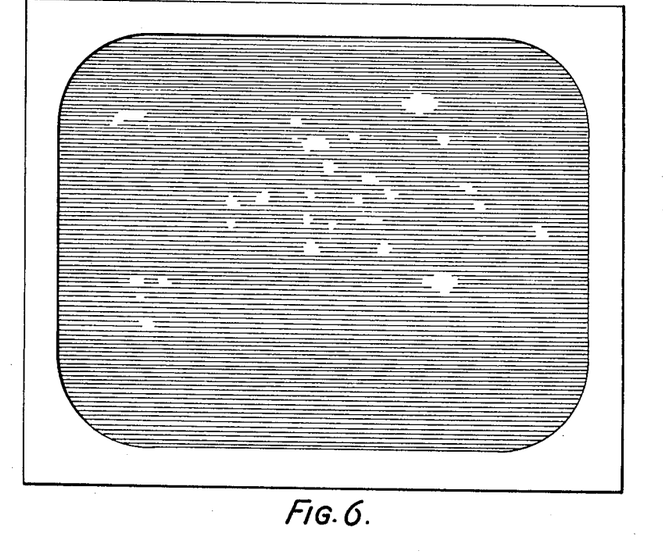

In an alternative arrangement the sheet is moved through an arc and a camera lens is located at the centre of curvature of this arc, the camera being panned to produce strict image arresting. Instead of panning the camera an oscillating or rotating mirror may be adapted to obtain image arresting and the camera will then be sighted on to the mirror. The former arrangement is shown in FIG. 5. As mentioned the camera will produce strict image arresting over the whole area of the sheet. The image will be undistorted regarded as a rendering in perspective on a plane, but since the sheet is curved towards the camera this will result in the sides of the sheet again showing a slight pincushion effect.

Figure 1:
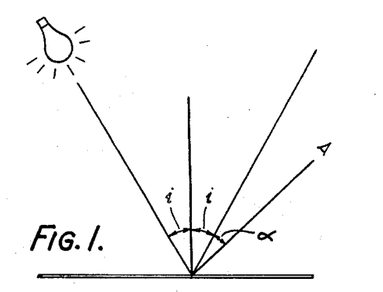
FIGURE 1 is a diagrammatic representation of a method of viewing a reflective surface.

The light source S once again extends transversely above the path of the sheet and is displaced by a certain amount from the camera lens and in the same horizontal plane. (This latter requirement is not a necessary condition of the arrangement shown in FIGURE 1.) For areas of the sheet near the perpendicular from the camera lens, the light entering the camera lens will be that scattered at an angle $$\tan^{-1}\frac{D}{R}$$

where D is distance from lamp to lens, R= distance from lens to strip. For angles $\theta$ off the centre line this will become $$\tan^{-1}\frac{D \cos \theta}{R}$$

Over a moderately large angle, therefore, the angle from which the light is scattered along the centre line of the sheet is moderately constant. For example, the field of view of a 1″ lens subtends ±13° approximately on an industrial television camera. As cos 13°=0.9744, the angle which the scattered light collected makes with the ideally reflected ray shown in FIGURE 5 varies by less than 3% along the centre line of sheet. If the sheet is followed over half its length, the lamps remaining fixed, this figure will rise to about 5%.

The conditions of illumination over a sheet in a cylindrical guide in the arrangement shown will thus be substantially the same over its whole area if viewed with a lens of moderately narrow angle of view such as is usually used on television and cine cameras.

Throughout its passage through the range that the camera covers, therefore, the faults can be shown up under chosen conditions of illumination. No mention has been made above of the conditions away from the centre line of the sheet (in the direction of motion) toward the extremes of the field of vision or to either side of the plane of the figure. Due to the continued effect of the different perpendicular distances between the respective light sources and the camera as viewed from a position toward either end of the sheet and the fact that away from the plane of the figure the angle off-specular is no longer $$\tan^{-1}\frac{D}{R} \text{ but } \tan^{-1}\frac{D \cos \theta}{R}$$

when $\theta$ is the angle of the light ray under consideration to the plane of the figure fault signals will creep in first at each corner. Adjustment of the lights must allow sufficient tolerance to cover this variation in off specular angle which will however be small.

Departure of the sheet from the plane or cylindrical guide may also throw off specular returns into the lens. If this is produced by irregularities in the sheet it is in effect another form of fault signal.

The principal advantage of dark-ground illumination i.e. viewing of diffusely reflected light is that by making the fault of a secondary light source against a dark background, the fault may be detected when the actual size of the fault is below the resolving power of the television system (as in the ultra-microscope). Furthermore, a counting method, operating from the brightening voltages in the television units, is also possible.

As so far described, in order to obtain image arresting either the television camera is panned so as to remain trained on an area of material or a mirror is rotated in front of the camera lens. This however does not provide a complete solution on flat material for the following reasons:

(1) Imperfections in the optical arresting which can be produced by a rotating mirror, (2) Because it is not possible by this means to secure consistent conditions of illumination over the whole area scanned.

This can be done, however, if the picture is built up progressively using a transverse band where defects are visible but the direct reflection of the light source is not.

This is achieved by an arrangement comprising:

(a) Light source to provide a substantially parallel beam of light illuminating a narrow strip of the surface of the tin plate transverse to its direction of motion.

(b) A slit which limits the view of the surface, seen from a direction perpendicular to the surface (or nearly so), to this narrow strip.

(c) Rotating mirror, lying on this perpendicular from the surface through this slit, and synchronised to the movement of the surface according to the relation $$wr=\frac{v}{2}$$

where $w$=angular velocity
$r$=distance from mirror to strip
$v$=velocity of strip (if viewed truly perpendicularly), or velocity component at right angles to line of sight (if viewed at an angle).

(d) Camera (television or photographic) viewing the surface via the rotating mirror, and the aperture of the slit.

(e) Masking hood extending from the camera to the slit and enclosing the rotating mirror, so that no light enters the camera except that coming direct from the surface via the slit.

(f) Monitor tube (where television is employed) with a form of persistence substantially longer than the time necessary for the complete length of strip portrayed on the monitor to pass in front of this slit.

In operation of this arrangement, when the surface being examined passes under the synchronised mirror the latter makes the surface as seen by the camera, appear stationary. The image of the slit on the other hand, appears to move across the camera's field of view with an apparent velocity equal and opposite to the real velocity of the tin plate being examined. When the image of the slit has passed across the camera field, the effect of the persistence tube when employing television will be to retain a complete picture filling the whole monitor screen before it dies away. The effect of the moving slit is not unlike that of a focal plane shutter in a photographic camera (the difference being that it is in the object space instead of the image space close in front of the plane of focus of the camera lens). One theoretical difference is that the slit, and the sample of tin plate seen through it seem to move round the surface of cylinders instead of in planes. Over the fairly narrow angles of view employed this produces a negligible error.

The width of the slit is governed by two main considerations:

(1) Limitation of the range of off-specular angles to be employed.

(2) Limitation of errors caused by the strip being flat instead of cylindrical (since perfect image arresting of flat material is only attained along the line perpendicularly below the axis of rotation of the mirror).

Any reduction in slit width below these theoretical limits will be of advantage in increasing the tolerance of the system to inaccuracies of speed matching of strip to mirror angular velocity. At the same time it reduces the effective illumination, in the same way as the exposure of the focal plane shutter in a camera is reduced by reducing the width of the slit.

The arrangement described makes it possible to photograph or present on a television monitor for a time sufficient for scrutiny, a stationary image of an extensive sample area of a rapidly moving sheet of tin plate. The surface examined will be displayed so that every elementary strip transverse to the direction of motion, is seen under the same conditions of illumination, i.e. those which obtain over the strip seen through the slit which limits the view of the camera. This feature is of particular value in inspecting materials which have highly directional reflecting properties.

The frequency of presentation of such arrested images can be varied:

(a) By using a multi-faced rotating mirror (b) By electrically starting the mirror so that at the desired instant it is rotating at the correct speed and in the correct position to present an "arrested image" to the camera.

(c) By using an existing rotating mirror instrument such as the Barr and Stroud "Web Viewer." This is an oscillating mirror driven at the correct velocity to arrest the image for visual purposes, but returning to its starting position with a rapid fly-back. Some auxiliary shuttering, optical or electronic, would be desirable to cut out the fly-back.

With the arrangement the image is truly "arrested" since the series of tin sheet is viewed perpendicularly to the direction of motion which is necessary in order to obtain perfect compensation for translational movement.

It will be realised that the surface to be examined need only move in a given plane when under the viewing slit. It may move over a roller to keep it in the desired position. Thus, the surface of a rotating cylinder is viewable by this means, and the entire surface of a cylinder can be viewed at once with this arrangement.

Another advantage of the arrangement is that high speeds of movement can be readily followed as the moving parts are restricted to a mirror, made as small as possible consistent with passing an unrestricted beam to fill the aperture of the camera lens.

Figure 7:
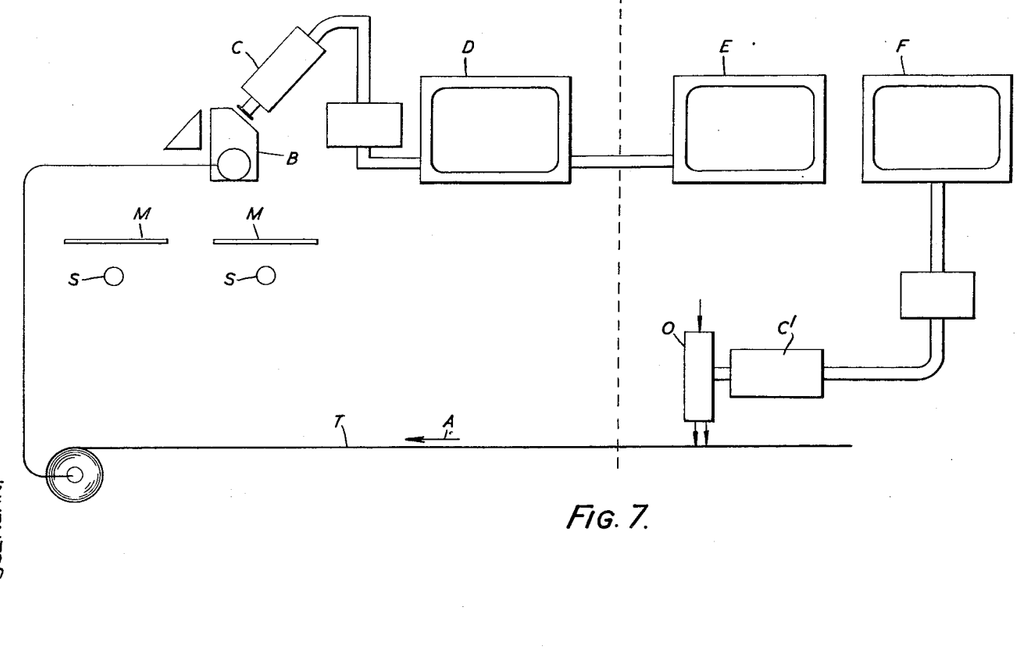
FIGURE 7 is a diagrammatic layout of a further viewing arrangement.
Figure 8:
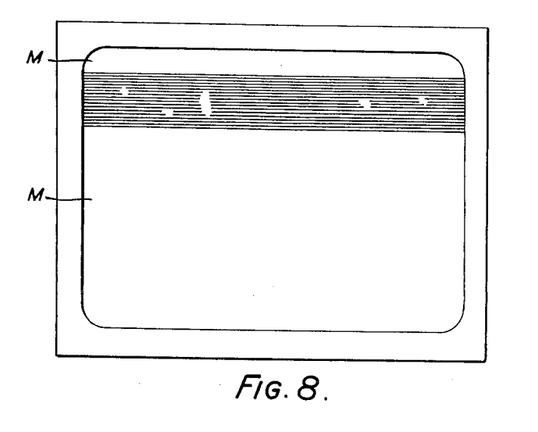
FIGURE 8 is a diagrammatic illustration of the instantaneous view initially obtained by the system of FIGURE 7.

Referring now to FIGURE 7, there is shown a "moving" slit viewing arrangement employing the Barr and Stroud "Web Viewer." Again, T indicates the tinplate travelling in the direction of the arrow marked A. Above the path of the tinplate are located two light sources S, a pair of masks M, a Barr and Stroud "Web Viewer" B, a television camera C, a control unit, an afterglow or storage monitor D, and if desired a short after-glow monitor E. The Barr and Stroud "Web Viewer" is an oscillating mirror instrument designed for the examination of repetitive patterns on a web without stopping the movement of the web. The television camera C is located in the position normally occupied by the eyes of an operator of the web viewer. Alternatively, a continuously rotating mirror can be used where repetitive patterns are not sought. This will produce a single transmission once per rotation, or $n$ times if a many sided mirror of $n$ faces is used. The field of view of the camera is restricted to a transverse strip ½ to 2 inches wide of the tinplate perpendicularly below the web viewer, by means of the masks M. By restriction of the field of view of the camera the inaccuracies of image arresting caused by the tinplate moving in a plane and not a cylinder can be reduced to a negligible figure. The web viewer moves in synchronism with the tinplate and during a single sweep of the viewer the field of view as reduced by the masks M appears to move progressively over an area of static tinsheet. If the frequency of scanning of the television camera is higher than that of the Web Viewer, successive images will be received each displaced relative to the preceding image and by adopting a long afterglow or storage tube, these successive images will produce a final image which will indicate all of the faults at one time which lie in the area of tinsheet covered in one sweep of the web viewer.

This picture must be examined by the operator for faults, and arrangements are made to shut off further pictures of the tinplate until the complete picture has been exposed to examination for a sufficient time.

It will be seen that if a limited number of faults are displayed by a dark ground method of illumination (that is to say, the faults appearing as bright spots against a dark ground) the faults illuminated as a result of a number of successive scans of the viewer can be displayed on a single presentation if a longer storage is available which in turn may lead to better sampling and assessment.

As in the previously described embodiments, the light sources extend transversely of the strip path and are located relative to the web viewer so that no light reflected specularly from the tinplate enters the camera but only diffusely reflected light.

The web viewer is capable of arresting the image of tinplate travelling at the highest stipulated speed of 1500 ft. min. if it is sited 10½ ft. from the sheet. A 3 ft. width of sheet can then be covered with a small latitude of positioning by a 1½ in. focal length camera lens. The total length of tinsheet which can be viewed in one frame will therefore be slightly over 30 inches with the normal 4:3 picture aspect ratio. With this arrangement the equivalent of a television line width on the tinplate is 0.05 inch. As already mentioned, the width of strip viewed is cut down to reduce the inaccuracies of image arresting and in the present instance would be cut down to a width equivalent at most to ±2¾° at the camera lens which is the equivalent of a 12 inch length of sheet. Since 1500 ft./min.=1/25 sec./ft., three scans of the raster at full speed will be sufficient to record one section of tinsheet which has passed by in 1/10 second. As the mirror frequency is ⅕ second the camera will in fact be receiving no picture for 50% of the time, which may be advantageous as regards shuttering the camera to avoid unwanted signals.

Figure 9:
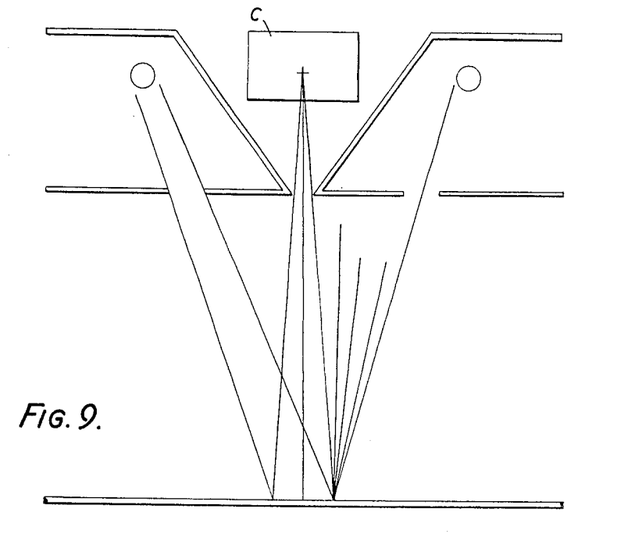
FIGURE 9 is a diagrammatic illustration of part of the apparatus of FIGURE 7 and the light paths.

Referring now to FIGURE 9, the selection of the position of the light source must be such as to take into account the maximum angle of detectable specular reflection from prime material (±α), and also an angle (γ) to allow for tilting of the tinplate.

The figures for the angles over which light scattered from faults is detectable are dependent to some extent upon the intensity of the lighting as there is no clearly defined limit to the diffuse scattering of light from defective material.

If the angle at which scattered light is collected is kept small the system will be more liable to show digs and crinkling in the material where, whilst the nature of the material is still specular, the local divergence of the surface from horizontal is sufficiently large to send light into the camera lens. Reference was made above to the allowance for a tinsheet being out of horizontal. So long as the departure from horizontal is not so severe as to throw the specular reflection into the camera, symmetrical arrangement of the light sources will tend to cancel out variations in the strength of the diffuse reflection caused by tilting of the sheet.

Figure 10:
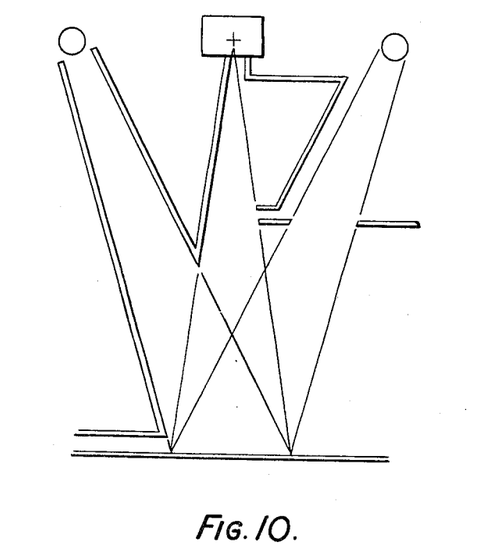
FIGURE 10 is a diagrammatic illustration of a particular arrangement of apparatus following the apparatus of FIGURE 9.

FIGURE 10 shows a practical arrangement for setting up the light sources, the viewer and the tinplate.

The web viewer will also detect recurrent faults, for example, resulting from a defect in a mill roll, if the amplitude of sweep of the viewer is matched to the length, given by the diameter of the faulty roll, over which the fault recurs. For this a non-persistent type of tube is desirable as indicated at E (FIGURE 7) so that the fault can be seen stroboscopically and the same camera can be used to feed both monitors, a single camera being capable of feeding up to four monitors providing the cable runs are reasonably short.

It will be appreciated that inspection could be effected by illuminating the sheet transversely, that is to say, by illumination from the side, this arrangement being advantageous for throwing into relief faults such as scratches which run parallel to the direction of motion of the tinplate.

In such an arrangement however light from a single source will have to be scattered by a greater angle from a defect in the centre of the strip than if the defect is near the edge. This might be overcome by using very brilliant illumination at a very oblique angle, so that the difference between the angles of scatter required is a small fraction of the total angle.

Alternatively, this could be remedied by more elaborate lighting arrangements.

Figure 11:
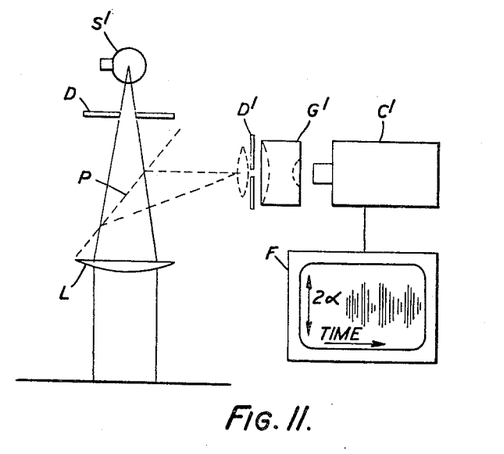
FIGURE 11 is a diagrammatic illustration of apparatus for providing a check of the concentration of specular reflection.

It may be desirable to provide an indication in the event that there is gross departure of the sheet from the horizontal. An arrangement is indicated in FIGURE 11 which constitutes an optical unit O, a camera C', a control unit and a monitor tube F. In more detail the optical unit O comprises, as shown in FIGURE 11, a light source S', a diaphragm D, a half-reflecting plate P, a lens L, a second diaphragm D' containing a slit ST, and an eyepiece G'. It will readily be apparent that an image will be obtained which is proportional to the specular reflectivity, and by sweeping the image slowly across a storage or persistence tube in a direction perpendicular to the length of slit ST, a record of the behaviour of the specular reflectivity could be stored over a considerable length of sheet.

Figure 12:
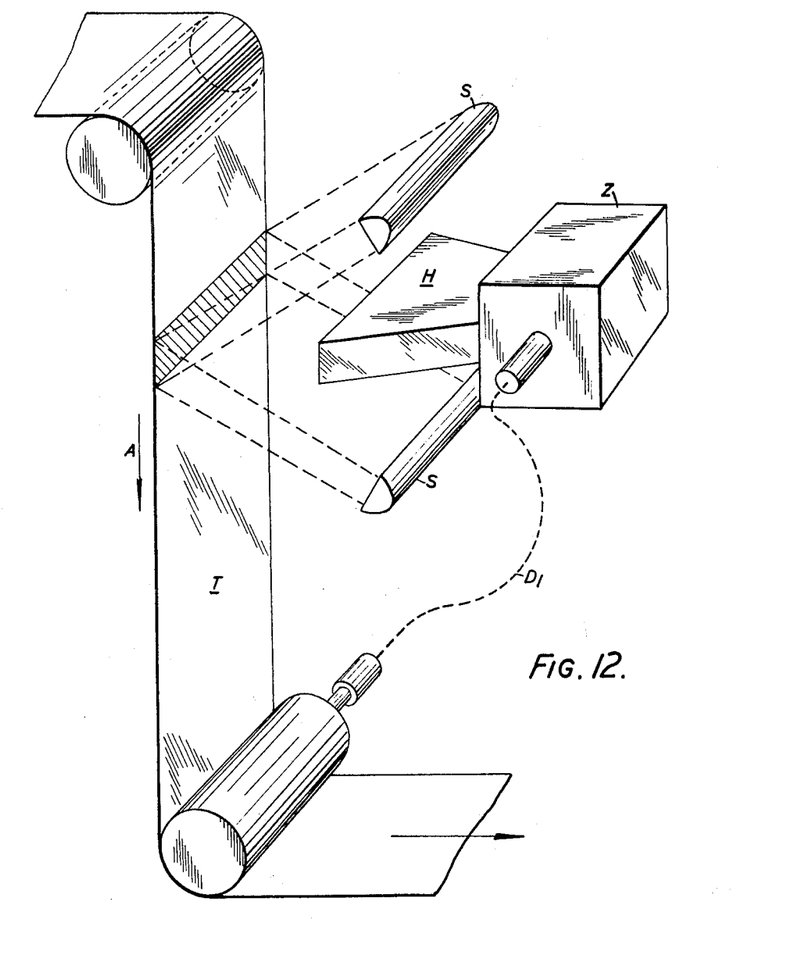
FIGURE 12 is a diagrammatic illustration of apparatus employing a "moving" slit image arresting arrangement.

Referring now to FIGURE 12, there is diagrammatically shown a "moving" slit viewing arrangement wherein the tin sheet which is again denoted by T moves in the direction of arrow A. Upper and lower light banks S are mounted to give the desired off-specular angle of illumination and illuminate a strip X of the tinsheet transverse to its direction of motion. The hood H in which is defined the viewing slit is positioned opposite the strip X so as to restrict the view of the television camera Z, indicated diagrammatically together with the image arresting optics at S, to the strip X. A drive connection D1 from the mill, serving to provide the drive means for the tin sheet, through suitable gearing rotates a mirror or mirrors in the optical unit so that the rotate at all times to the appropriate velocity to produce exact image arresting.

In a practical system, the instrument is set up within the bay formed by four upright rolled steel joints, and a large plane mirror (back silvered) introduced to deflect the view of the camera. The hood H is made in the form of an almost exactly isosceles triangle, with the large mirror lying flat against one side. The opposite corner is cut back and the rotating mirror unit placed there. The slit runs across the base and is set back from the edges of the top and bottom surfaces of the hood, to shield the edges of the slit from stray light which might be seen reflected from the strip. For the same reason, a dummy portion of the slit is extended beyond the aperture actually required so that this constitutes the only object which could be seen reflected in the strip across its whole width. The hood is of wood and hardboard. To allow the camera to be mounted horizontally for greater convenience, a plane mirror giving another right angle reflection is incorporated in the rotating mirror unit.

Various off-specular viewing angles may be employed. It is found that the defect known as "wood grain" (which describes exactly the pattern it produces on the tinsheet) is not visible under off-specular angles of lighting ranging from 10 to 20 degrees, at which almost all other defects are viewable on television. Using accurately collimated lighting it is found that it could be seen via the television channel only between 3° and 5° off-specular. At 3° this is in fact running into the specular return from the tinplate, and other types of defect begin to show darker against the background of returns from prime tinsheet. Within the 3° to 5° range, the light reflected from prime increases very rapidly as the off-specular angle diminishes. The conditions suitable for viewing wood grain, and also any faults which show up as small changes in the contour of the prime surface (e.g. skin laminations not breaking the surface) are not suitable for the majority of defects. In order to enable faults such as wood grain and other larger defects to be detected, the hood is tilted so as to incline slightly the axis of view of the camera. In one arrangement, with the lamp units mounted symmetrically above and below the hood, illuminating the portion of strip examined at approximately 10° off-specular, the hood is tilted by 2½° to change the off-specular angles for top and bottom banks of lights to approximately 4° (minimum) and 15° (mean). The effect of the change in angle is augmented by the fact that the hood looks at a portion of the strip higher up.

In one form of "moving" slit system employing a multifaced continuously rotating mirror, a double sided mirror is used. The shaft of a bridle roll on the mill is utilized to drive a transmitter magslip which drives the receiver magslip at the appropriate speed through a 50:1 reduction gear. An appropriate degree of gearing down is introduced between the roll shaft and the receiver magslip to impart the correct angular velocity to the mirror. The effect produces an image on the monitor screen once every two seconds at a line speed of the tinsheet of 1500 ft. per min. By means of a suitable long persistence vidicon camera tube, an image is obtained which is visible for an interval ranging from about ½ to 10 seconds or more according to the luminance of the original subject.

In operation, the image of the slit in moving downwards across the monitor screen leaves behind a "paint" presenting the appearance of the tin sheet as produced by the lighting conditions in conjunction with the characteristics of the television channel. By turning up the monitor brightness control, a "picture" can be obtained of the tin sheet which is fairly realistic, showing under "narrow angle" lighting the stress wrinkles produced by the tension of the material. The correct adjustment, however, is to put the brightness so low that prime material produces a negligible brightening of the monitor, and defect material appears bright on the screen. It is possible to obtain a boldness of presentation of defects which make appraisal very rapid so that a considerable number of pictures per minute can be dealt with by an inspector.

A high sampling rate is enabled to be obtained by the use of a long-persistence display unit in the television by which a number of pictures may be superposed on the display. The dark-ground presentation makes this a practical proposition since if the defects are few in number the chance of them falling one on the other is small. If the defect area is extensive, the material is classifiable as reject, and the persistence of the display does not render the location of the defect material any more uncertain than if the sampling rate is so low that one picture substantially disappears before it is replaced by the next. The effect of superposing pictures much more rapidly than they will decay is that there is a "population" of defects visible on the screen which is a function of the number of defects occurring in an area of $n \times A$ of the strip where A is the area covered by the field of view of the television channel, and $n$ is the number of pictures presented within the time of persistence of one picture. For a display which dies away exponentially, the brightness of the most recently "painted" defects is greatest but the population will nevertheless give a fairly accurate estimate of the frequency of occurrence of defects.

Such higher sampling rates, up to 100%, can be achieved with a multi-sided continuously rotating mirror. The peculiar characteristics of a system building up images from a very restricted field of view severely restrict the usefulness of a system of mirrors applied to the outer surface of a prism or drum. The reason for this can be summed up as follows: As has been mentioned, the image arresting function of the mirror rotation causes the moving strip to appear stationary, and conversely, the fixed slit appears to move across the field of view. To maintain a fully illuminated picture of the slit, the mirror must reflect the full diameter of beams entering the camera lens from the slit at any point in the travel of the mirror. To do this the mirror must move across the space in front of the camera lens in the same direction and at the same angular velocity as the image of the slit it produces. For this, the point of rotation of the mirror must be in front of the mirror, not behind it. The translational movement of the mirror which is produced by the finite radius of any multi-faced system can then be employed to keep a mirror of minimal diameter in the correct position to send a beam of the full diameter necessary into the camera lens. The next mirror produces another image in the camera as soon as the image produced by the first mirror passes out of the field of view.

Figure 13:
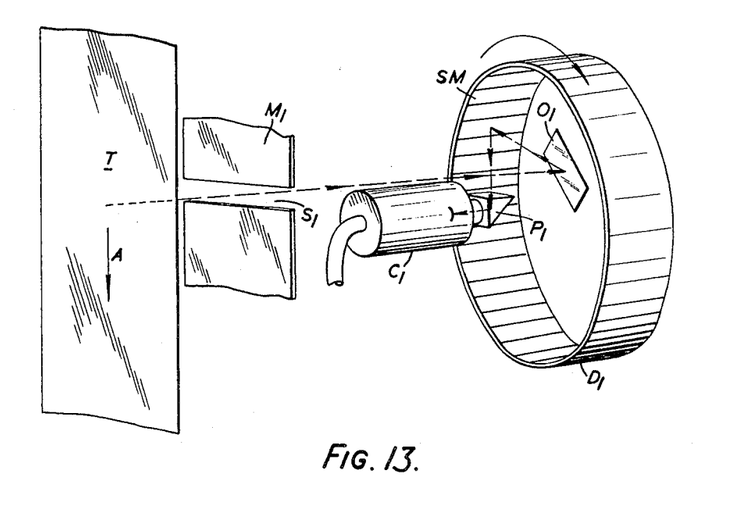
FIGURE 13 is a diagrammatic illustration of a "moving" slit image arresting arrangement employing a multiface continuously rotating mirror system.

An optical system fulfilling these conditions and providing for 100% scanning comprises a plurality of strip mirrors secured to the inside surface of a rotating drum as is shown in FIGURE 13, the mirrors being indicated by $Sm$ and the drum by $D1$. The incident and reflected rays must be in a plane perpendicular to the axis of the drum. The light beam from the strip of the sheet T travelling in the direction of arrow A, the beam being determined by the slit S1 in the mask M1, is introduced to the multi-face rotating mirror system via a large oblique mirror O1, and after reflection from that system, enters the television camera C1, through a right angle prism P1. The camera by this arrangement can be set up so that the entrant beam lies on the same side of the drum as the camera. One end of the drum is thereby enabled to be made enclosed, simplifying the design for the pivot about which the drum rotates.

The angle between mirrors must be half the field of view in the direction of strip movement, of the television camera. If a 30 mm. "Vidital" lens is employed, the vertical field of view if 18°, so that mirrors are set at 9° intervals, giving 40 mirrors to the drum. The drum may be fabricated in aluminum and have an inside diameter of 21.25 inches, in which case the mirrors are 1.6 x 3.5 inches, back silvered.

If the cameras look through the drum, four cameras can theoretically be "fed," at each position where the rotating mirrors are at 45° to the vertical. Where the beam goes in and out the same end of the drum, as in the construction described, two cameras can be fitted, this allowing experiment with different cameras, degree of magnification, off-specular angle, etc.

In a construction employing two cameras, the axis of view of one camera is tilted upwards, while the other strikes the strip perpendicularly. An extra pair of mirrors introduced in each beam termed off-set mirrors (inner and outer) perform two functions:

(1) One pair directs the axis of the view of the camera upwards at the required angle, since it must enter and leave the drum horizontally.

(2) The inner mirrors (which the light from the strip first falls on) are brought in till the separation between the two axes of view is correct so that they converge on the same portions of strip. The hood is provided with two slits and a septum runs up the middle to screen the view of one slit from the opposite camera.

The two lamp boxes employed for illuminating a transverse strip of the tinsheet are arranged to operate at approximately 15° of specular but the tilt of the axis of view of the lower camera will bring the off-specular angle down to between 4° and 5° minimum when the effect of the size of light source and slit is allowed for. The lower camera will then be suitably adjusted for detecting "narrow-angle" defects. At the same time, the upper camera can operate at about 15° off-specular, using both banks of lights.

The drum is driven by a receiver magslip, geared down to 40:1. By this means a shaft is available for purposes of switching which rotates once per mirror face. The magslip and gearbox assembly are grouped around the spindle of the drum clear of the light-beams and cameras. To avoid violent inertia loads during sudden stoppages of the mill, the mirror drum which in this instance weighs about 50 lbs., has a friction clutch fitted to its shaft. At 1500 feet per min. line speed the drum will rotate at 15 r.p.m.

In this particular arrangement, the path length from rotating mirror face to tinplate is 95.5 inches, and to the camera lens 100 inches. This corresponds to a strip travel of 2½ ft. per mirror face, or 100 ft. per drum revolution. The camera field will be approximately 41.5 by 31.25 inches, leaving a very small gap on either side of the strip edges. The slight degree of over-sampling given by the vertical coverage can be removed by adjusting the frame amplitude to cover 30 inches.

In test on this system, by using a long persistence monitor and a target with a black background and a limited number of white "defects," a comfortable and readable presentation is produced, the signals never piling up so as to confuse the presentation.

With the attainment of 100% inspection facilities, photography can provide a ready-made method of permanent recording and location of defects throughout the length of a coil of tinsheet. Films can be made with one exposure (frame) per mirror face or more mirror faces per frame according to the accuracy of defect location required. For this a short persistence system would be suitable. A 100 ft. reel of 16 mm. film has 4000 frames, or 16,000 if used on an 8 mm. double-run system, the definition of which would probably prove adequate, and with such a reel the quality of 10,000 to 40,000 feet of strip could be permanently recorded. Much smaller lengths of film could be used if a high accuracy of fault location was not needed. There is great scope for variation in auxiliary methods of photographic recording. Although in theory photography can be used without the interposition of television, the latter gives valuable extra facilities of control and surveillance.

It will be seen that the above described arrangements provide means for inspecting the surface of tinplate which will permit a view of a number of consecutive portions of the sheet at one and the same time, whereas if that same number of portions were inspected by eye the inspector would have to retain an assessment of all those portions preceding the last before deciding on acceptance or rejections which would lead to errors. Use of this apparatus allows more consistent inspection and visual inspection of sample areas at line speeds where this would otherwise be impossible.

Automatic inspection may also be obtained utilizing the described systems and by producing an electrical signal from the television camera.

I claim:

1. Apparatus for testing the surface quality of moving elongate material comprising means for illuminating the material surface in an area extending transverse the path of material movement, an optical system for receiving light from the illuminating means by reflection from the material to form an image of the illuminated surface, means for moving at least part of the optical system in the direction of material movement relative to the optical path of such system to neutralise optically image movement which would otherwise result from movement of the material, and means for recording the image formed by the optical system.

2. Apparatus for testing the surface quality of moving elongate material, comprising: means for illuminating the material surface in an area extending transverse the path of material movement; an optical system for receiving light from the illuminating means by reflection from the material to form an image of the illuminated material surface, which system includes light reflecting means and means for moving the same in the direction of material movement relative to the optical path of said optical system at the light reflecting means to neutralise optically the image movement which would otherwise occur as a result of movement of the material; and means for recording the image formed by the optical system.

3. Apparatus for testing the surface quality of moving elongate material, comprising: means for illuminating the material surface in an area extending transverse the path of material movement; an optical system for receiving light from the illuminating means by reflection from the material to form images of strips of illuminated material extending substantially perpendicularly across the path of material movement, which system includes a mirror to reflect the strip images and means for rotating the mirror about an axis substantially parallel to the axis of said strip images to neutralise optically the image movement which would otherwise occur as a result of movement of the material; and means for recording said strip images.

4. Apparatus according to claim 3 comprising means for controlling the rate of movement of said mirror in response to the rate of material movement whereby the spatial relationship of successive strip images is maintained the same as that of the successive illuminated strips of material from which such images originate.

5. Apparatus according to claim 3 wherein said optical system comprises a mask having a slit form aperture therein to form said strip images.

6. Apparatus according to claim 5 wherein said mask is located, relative to the illuminating means and the path of material movement, to pass off-specularly reflected light through the slit aperture.

7. Apparatus according to claim 3 wherein the image recording means comprises a television camera tube.

8. Apparatus according to claim 7 comprising a cathode ray tube operably connected to said television camera tube to provide a visual indication of the camera tube output signal.

9. Apparatus according to claim 7 wherein said cathode ray tube has a fluorescent screen coated with a relatively long persistence phosphor to provide a long after-glow.

10. Apparatus according to claim 7 wherein the camera tube is positioned to receive strip images with their axis horizontal relative to the camera tube whereby successive images are scanned vertically relative to the camera tube by movement of said mirror.

11. Apparatus according to claim 3 wherein said mirror is rotatable.

12. Apparatus according to claim 11 wherein said mirror is in the form of a drum having a plurality of planar strip mirrors arranged around the drum internal surface in edge-to-edge disposition and with their axes parallel to that of the drum, and wherein the mirror moving means rotates the drum about its axis.

13. Apparatus according to claim 11 wherein the mirror moving means reciprocates said mirror.

14. Apparatus for testing the surface quality of moving elongate material, comprising: stationary means for illuminating the material surface in an area extending transverse the path of material movement; a mask having a slit therein for receiving light from the illuminating means by off-specular reflection from the material to form images of successive strips of illuminated material extending substantially perpendicularly across the path of material movement; a first mirror located in the path of said images to reflect the same along a common path substantially perpendicular to the images' path of incidence at the first mirror; a second mirror located in the path of images reflected from the second mirror, which second mirror is rotatable about an axis parallel to the axes of images incident thereon to reflect successively incident images along successive paths of reflection each different from said common path; a third mirror located in the paths of images reflected from the second mirror to reflect such images along respective paths each parallel to the path of image incidence at said first mirror; and means for recording the images reflected from said third mirror.

15. Apparatus according to claim 14 wherein said second mirror is formed by a plurality of mirror strips located edge-to-edge to form an internally reflecting drum having its axis parallel to the path of image incidence at said first mirror and rotatable about its axis, and wherein the recording means is in the form of a television camera tube; comprising means for rotating said drum about its axis in synchronism with movement of the material whereby the successive images reflected by each mirror strip of said drum in one cycle of rotation thereof are scanned across said camera tube during a frame interval thereof.

References Cited by the Examiner

UNITED STATES PATENTS

| 2,315,282 | 3/43 | Snow | 88—14 |
| 2,910,908 | 11/59 | Meyer | 250—219 X |
| 2,947,212 | 8/60 | Woods | 88—14 |
| 3,023,900 | 3/62 | Thier | 346—33 X |

LEO SMILOW, *Primary Examiner.*